(12) United States Patent
Takada et al.

(10) Patent No.: US 7,993,782 B2
(45) Date of Patent: Aug. 9, 2011

(54) ALL-SOLID LITHIUM BATTERY

(75) Inventors: Kazunori Takada, Ibaraki (JP); Narumi Ohta, Ibaraki (JP); Lianqi Zhang, Ibaraki (JP); Takayoshi Sasaki, Ibaraki (JP)

(73) Assignee: National Institute For Materials Science, Tsukuba-shi (JP)

( * ) Notice: Subject to any disclaimer, the term of this patent is extended or adjusted under 35 U.S.C. 154(b) by 733 days.

(21) Appl. No.: 11/994,346

(22) PCT Filed: Jun. 30, 2006

(86) PCT No.: PCT/JP2006/313150
§ 371 (c)(1),
(2), (4) Date: Dec. 31, 2007

(87) PCT Pub. No.: WO2007/004590
PCT Pub. Date: Jan. 11, 2007

(65) Prior Publication Data
US 2009/0081554 A1    Mar. 26, 2009

(30) Foreign Application Priority Data
Jul. 1, 2005    (JP) .................. 2005-194363

(51) Int. Cl.
H01M 6/18 (2006.01)
H01M 4/13 (2006.01)
H01M 4/58 (2006.01)
H01M 4/82 (2006.01)
H01M 6/00 (2006.01)

(52) U.S. Cl. ............. 429/314; 429/231.95; 429/218.1; 429/623.5

(58) Field of Classification Search ........... 429/314, 429/231.95, 218.1; 29/623.1, 623.5
See application file for complete search history.

(56) References Cited

U.S. PATENT DOCUMENTS

| | | | | |
|---|---|---|---|---|
| 5,217,826 A | * | 6/1993 | Yamamura et al. | 429/319 |
| 5,558,961 A | * | 9/1996 | Doeff et al. | 429/224 |
| 5,705,291 A | * | 1/1998 | Amatucci et al. | 429/137 |
| 5,958,281 A | * | 9/1999 | Takada et al. | 429/305 |
| 6,025,094 A | * | 2/2000 | Visco et al. | 429/231.95 |

FOREIGN PATENT DOCUMENTS

| | | |
|---|---|---|
| JP | 6-111831 A | 4/1994 |
| JP | 11-7942 A | 1/1999 |
| JP | 2001-52733 A | 2/2001 |
| JP | 2001-210374 A | 8/2001 |
| JP | 2003-68361 A | 3/2003 |
| JP | 2003-173770 A | 6/2003 |
| JP | 2003-217663 A | 7/2003 |
| JP | 2004-103566 A | 4/2004 |
| JP | 2005-235686 A | 9/2005 |
| JP | 2006-120437 A | 5/2006 |

OTHER PUBLICATIONS

International Search Report of PCT/JP2006/313150, date of mailing Sep. 19, 2006.
K. Takada et al.; "Solid state lithium battery with oxysulfide glass"; Solid State Ionics, 86-88, pp. 877-882, 1996.
A. Hayashi et al.; "Electrochemical Properties for the Lithium Ion Conductive $(100-x)(0.6Li_2S.0.4SiS_2).xLi_4SiO_4$ Oxysulfide Glasses"; Journal of the Electrochemical Society, vol. 146, pp. 3472-3475, 1999.
T. Minami et al.; "Preparation and characterization of lithium ion-conducting oxysulfide glasses", Solid State Ionic 136-137, pp. 1015-1023, 2000.
R. Kanno et al.; "Lithium Ionic Conductor Thio-LISICON"; Journal of the Electrochemical Society, vol. 148, No. 7, pp. A742-A746, 2001.
K. Iio et al.; "Mechanochemical Synthesis of High Lithium Ion Conducting Materials in the System $Li_3N-SiS_2$"; Chem. Mater., 14, pp. 2444-2449, 2002.
N. Machida et al.; "All-Solid-State Lithium Battery with $LiCo0.3Ni0.7O_2$ Fine Power as Cathode Materials with an Amorphous Sulfide Electrolyte"; Journal of the Electrochemical Society, vol. 149, pp. A688-A693, 2002.
J. Cho et al.; "Enhancement of Thermal Stability of $LiCoO_2$ by $LiMn_2O_4$ Coating", Electrochemical and Solid-State Letter, vol. 2, No. 6, pp. 253-255, 1999.
J. Cho et al.; "Improvement of Structural Stability of $LiCoO_2$ Cathode during Electrochemical Cycling by Sol-Gel coating of $SnO_2$", Electrochemical and Solid-State Letter, vol. 3, No. 8, pp. 362-365, 2000.
J. Cho et al.; "Zero-Strain Intercalation Cathode for Rechargeable Li-Ion Cell"; Angew Chem. Int. Ed., vol. 40, No. 18, pp. 3367-3369, 2001.
A. M. Kannan et al.; "High Capacity Surface-Modified $LiCoO_2$ Cathodes for Lithium-Ion Batteries", Electrochemcial and Solid-State Letters, vol. 6, No. 1, pp. A16-A18, 2003.
H. Cao et al.; "$LiAlO_2$-coated $LiCoO_2$ as cathode material for lithium ion batteries", Solid State Ionics, 176, pp. 911-914, 2005.

(Continued)

Primary Examiner — Patrick Ryan
Assistant Examiner — Julian Mercado
(74) Attorney, Agent, or Firm — Westerman, Hattori, Daniels & Adrian, LLP (57) ABSTRACT

An all-solid lithium secondary battery has excellent reliability including safety. However, in general, its energy density or output density is lower than that achieved by liquid electrolyte systems.
The all-solid lithium battery includes a lithium ion-conducting solid electrolyte as an electrolyte. The lithium ion-conducting solid electrolyte is mainly composed of a sulfide, and the surface of a positive electrode active material is coated with a lithium ion-conducting oxide. The advantages of the present invention are particularly significant when the positive electrode active material exhibits a potential of 3 V or more during operation of the all-solid lithium battery, i.e., when redox reaction occurs at a potential of 3 V or more.

14 Claims, 7 Drawing Sheets

OTHER PUBLICATIONS

Shiro Seki et al.; "Fabrication of High-Voltage, High-Capacity All-Solid-State Lithium Polymer Secondary Batteries by Application of the Polymer Electrolyte/Inorganic Electrolyte Composite Concept"; Chem. Mater, 17, pp. 2041-2045, 2005.

"Development of All-Solid-State Lithium Secondary Batteries (III)—Experimental Fabrication of Composite All-Solid-State Batteries Using RF Sputtering Method-", Central Research Institute of Electric Power Industry Report, Apr. 2003, pp. 1-8, Central Research Institute of Electric Power Industry.

Machida, N. et al., "Mechanical Milling Preparation of Amorphous Materials in the System $Li_3PS_4$-$Li_4P_2S_7$-$Li_4P_2S_6$ and Their Structure and Electrochemical Property", The 30th Symposium on Solid State Ionics in Japan; Dec. 1-3, 2004, pp. 30-31, Kyoto, Japan.

Machida, N. et al., "A New Amorphous Lithium-ion Conductor in the System $Li_2S$-$P_2S_3$", Chemistry Letters, 2004, pp. 30-31, vol. 33, No. 1, The Chemical Society of Japan.

Ohtomo et al., "Electrical and Electrochemical Properties of $Li_2S$-$P_2S_5$-$P_2O_5$ Glass-Ceramic Electrolytes", Journal of Power Sources, 2005, pp. 715-718, vol. 146, Elsevier B. V.

* cited by examiner

ALL-SOLID LITHIUM BATTERY

TECHNICAL FIELD

The present invention relates to a lithium battery achieving excellent safety by use of a nonflammable electrolyte, i.e., an inorganic solid electrolyte.

BACKGROUND ART

Safety concerns such as inflammation are essential problems for lithium batteries incorporating flammable organic solvent electrolytes. A radical solution to this problem of safety is to use a nonflammable electrolyte to replace the flammable organic solvent electrolyte. Representative examples of the nonflammable electrolyte are inorganic lithium ion-conducting solid electrolytes. Use of inorganic solid electrolytes not only enhances the safety but also allows integration with electronic circuits since the batteries can be formed as thin films. Moreover, since inorganic solid electrolytes have ion-selectivity, the reliability of batteries, such as cycle lifetime and storage lifetime, can be improved.

The cause of most of self-discharge and a decrease in capacity accompanying charge-discharge cycle is the side reaction inside the batteries. In lithium batteries, in particular, lithium ion batteries, the ions that contribute to the electrode reaction are lithium ions only. However, in liquid electrolytes, anions, solvent molecules, and impurities also migrate and diffuse in positive electrode surfaces having high oxidizing power or negative electrode surfaces having high reducing power, thereby sometimes resulting in oxidation or reduction. Such side reactions degrade the battery performance.

In contrast, inorganic solid electrolytes have ion selectivity. That is, only lithium ions move in the lithium ion-conducting inorganic solid electrolyte. Thus, unlike in the liquid electrolytes, continuation of side reactions caused by diffusion of matters other than lithium ions in the electrode surfaces is prevented. Therefore, all-solid batteries incorporating inorganic solid electrolytes have long life and achieve low self-discharge.

The present inventors have previously invented a method in which a carbon material having a low potential and a high capacity density is used as the negative electrode material of an all-solid lithium secondary battery (patent document 1) and succeeded in increasing the energy density of the all-solid lithium secondary battery (patent document 2). However, the output density obtained from the all-solid lithium secondary batteries was only about several hundred microamperes per square centimeter, which was still low compared to that achieved by liquid electrolyte systems.

Patent Document 1: Japanese Unexamined Patent Application Publication No. 2003-68361
Patent Document 2: Japanese Unexamined Patent Application Publication No. 2003-217663

DISCLOSURE OF INVENTION

Problems to be Solved by the Invention

All-solid lithium secondary batteries have high reliability including safety as described above. However, in general, the energy density or the output density is lower than that of the liquid electrolyte systems, and this drawback must be overcome if the battery is to be used as general-purpose batteries. An object of the present invention is to overcome the above-described problems and to provide an all-solid lithium secondary battery having excellent high output properties.

Means for Solving the Problems

In order to increase the output of the all-solid lithium secondary battery, a solid electrolyte having a high ion conductivity must be used as the solid electrolyte. Solid electrolytes exhibiting an ion conductivity of $10^{-3}$ S/cm or more at room temperature known are oxides such as $LiTi_2(PO_4)_3$ having a NASICON structure, its related compounds, and $(Li,La)TiO_3$ having a perovskite structure; and lithium nitride.

However, the oxides above are compounds containing titanium which is highly susceptible to electrochemical reduction. Thus, when these oxides are used as the electrolyte of the all-solid lithium battery, electronic conduction is generated by the reduction of titanium and the compound can no longer function as the electrolyte. In contrast, lithium nitride has a decomposition voltage as low as 0.45 V and cannot be used as the electrolyte for a high-voltage lithium battery. In contrast to these solid electrolytes having low electrochemical stability, sulfide solid electrolytes have both high ion conductivity and electrochemical stability.

However, according to the present inventors' review on electrochemical stability of the sulfide solid electrolytes, it has been found that although the sulfide solid electrolyte does not undergo continuous decomposition reaction upon application of a high potential, a high-resistance layer is formed at the interface at which the electrolyte contacts the positive electrode active material that shows electrode reaction at a high potential. It has also been found that this high resistance layer is the cause of incapacity to generate high output current.

The preset invention is based on the finding that formation of the high-resistance layer can be effectively suppressed by providing a lithium ion-conducting oxide layer at the interface between the positive electrode active material and the sulfide solid electrolyte.

The reports that have been made so far teach that the sulfide solid electrolytes, in particular, sulfide solid electrolytes free of lithium iodide, are electrolytes having superior oxidation resistance (see Literatures 1 to 6 below).
(1) K. Takada, N. Aotani, K. Iwamoto, S. Kondo, Solid State Ionics, 86-88, pp. 877-882 (1996)
(2) A. Hayashi, M. Tatsumisago, T. Minami, J. Electrochem. Soc., 146, pp. 3472-3475 (1999)
(3) T. Minami, A. Hayashi, M. Tatsumisago, Solid State Ionics, 136-137, pp. 1015-1023 (2000)
(4) R. Kanno, M. Murayama, J. Electrochem. Soc., 148, pp. A742-A746 (2001)
(5) K. Iio, A. Hayashi, H. Morimoto, M. Tatsumisago, T. Minami, Chem. Mater., 14, pp. 2444-2449 (2002)
(6) N. Machida, H. Maeda, H. Peng, T. Shigematsu, J. Electrochem. Soc., 149, pp. A688-A639 (2002)

In contrast, the present invention is based on the finding that a high-resistance layer is formed at the interface when the sulfide solid electrolyte contacts the positive electrode active material at 4 V or higher on a lithium electrode basis, i.e., that the oxidation resistance of the sulfide solid electrolyte is not as high as it has been reported in the past. The present invention overthrows the conventional understanding and is clearly novel.

With respect to the coating on the surface of the positive electrode active material, several reports teach that coating is effective for improving the performance of the lithium battery. J. Cho, G. Kim, Electrochem. Solid-State Lett. 2, pp.

253-255 (1999) discloses that the reaction between the electrolyte and $LiCoO_2$ can be suppressed by coating the surface of the $LiCoO_2$ powder with $LiMn_2O_4$ and that the cycle characteristics are improved as a result of the stabilized structure of $LiCoO_2$.

J. Cho, C.-S. Kim, S.-I. Yoo, Electrochem. Solid-State Lett. 3, pp. 362-365 (2000) discloses that the structural phase transition from the hexagonal system to the monoclinic system is suppressed when the surface of the $LiCoO_2$ powder is coated with $SnO_2$, and that the cycle characteristics are improved thereby.

J. Cho, Y. J. Kim, T.-J. Kim, B. Park, Angew. Chem. Int. Ed. 41, pp. 3367-3369 (2001) discloses that the change in interlayer distance of $LiCoO_2$ resulting from intercalation, de-intercalation of lithium ions can be suppressed by coating the $LiCoO_2$ particle surface with $ZrO_2$, $Al_2O_3$, $TiO_2$, or $B_2O_3$ and that the cycle characteristics are improved thereby.

Electrochem. Solid-State Lett. 6, pp. A16-A18 (2003) discloses that the chemical and structural instability can be moderated by coating the $LiCoO_2$ particle surface with $Al_2O_3$, $TiO_2$, or $ZrO_2$ and that the cycle characteristics are improved thereby. Solid State Ionics, 176, 911 (2005) discloses that the discharge capacity and the cycle life are improved by coating the $LiCoO_2$ powder surface with $LiAlO_2$ although the structural phase transition from the hexagonal system to the monoclinic system is not suppressed.

Although several reports disclose formation of the coating layer on the surface of the positive electrode active material, the main advantage of the coating layer is an improvement in cycle characteristics. Since the organic solvent electrolyte used in these existing examples has an ion conductivity as high as $10^{-2}$ S/cm, the output performance will decrease if a coating layer composed of a lithium ion-conducting oxide with lower ion conductivity is provided at the interface.

In the present invention also, a coating layer composed of a lithium ion-conducting oxide having a lower ion conductivity than a sulfide solid electrolyte having an ion conductivity of $10^{-3}$ S/cm is formed. Although this structure is presumed to degrade the output performance compared to when the positive electrode active material directly contacts the sulfide solid electrolyte, the present inventors have found that, contrary to the presumption, the high-rate discharge performance is significantly improved by this structure. The present invention has been made on the basis of this finding and obviously has effects and advantages distinct from the existing examples.

S. Seki, Y. Kobayashi, H. Miyashiro, Y. Mita, T. Iwahori, Chem. Mater., 17, pp. 2041-2045 (2005) discloses that the oxidative decomposition of the polymeric electrolyte can be suppressed by coating the $LiCoO_2$ particle surfaces with $Li_3PO_4$ and that the internal impedance of the polymer lithium battery can be reduced as a result.

However, the polymeric electrolyte used in this report is mainly composed of polyethylene oxide, which is known to have a low resistance to oxidation. In contrast, the present invention is based on the finding that the sulfide solid electrolyte, which has been considered to have superior resistance to oxidation, has instability.

The advantages of the present invention cannot be achieved without this new finding and it is also obvious that the present invention is not made by the combination of related art. In these existing examples, there has been no limit on whether the oxide coating the positive electrode active material has ion conductivity. The present invention is clearly distinctive from these existing examples in this regard also.

According to the present invention, the surface of the positive electrode active material is coated with a lithium ion-conducting oxide so that the lithium ion-conducting oxide is interposed between the positive electrode active material and the solid electrolyte mainly composed of a sulfide to suppress formation of the high-resistance layer. Examples of the method for forming a structure including a positive electrode active material, a solid electrolyte mainly composed of a sulfide, and a lithium-ion conducting oxide between the positive electrode active material and the solid electrolyte include a method in which the surfaces of the positive electrode active material particles are coated with a lithium ion-conducting oxide and the positive electrode active material particles are mixed with a solid electrolyte powder mainly composed of the sulfide to form an electrode and a method in which the positive electrode active material thin film surface is coated with a lithium ion-conducting oxide and brought into contact with the solid electrolyte mainly composed of a sulfide.

ADVANTAGES OF THE INVENTION

In an all-solid lithium battery incorporating a lithium ion-conducting solid electrolyte mainly composed of a sulfide, superior output performance can be achieved by coating the surface of the positive electrode active material with a lithium ion-conducting oxide. Moreover, since the chemical potential of the sulfide solid electrolyte is 2.5 V or less, formation of the high-resistance layer is particularly problematic when the potential of the positive electrode active material is 3 V or more. The advantages of the present invention are particularly significant when the positive electrode active material exhibits a potential of 3 V or more during operation of the all-solid lithium battery, i.e., when redox reaction occurs at a potential of 3 V or more.

BEST MODE FOR CARRYING OUT THE INVENTION

When an electrode active material contacts an electrolyte, mass transfer occurs in the contact interface due to a difference in chemical potential of these materials. Although the chemical potential of a sulfide solid electrolyte has not been determined so far, it is 2.5 V or less versus a lithium electrode, which is the oxidation potential of the sulfide ions. When such a solid electrolyte contacts a positive electrode active material having a chemical potential of 4 V or more versus a lithium electrode, the extent of mass transfer in the interface is large due to a large difference in chemical potential. As a result, a high-resistance layer is formed in the interface.

This mass transfer can be suppressed by coating the positive electrode active material surface with the lithium ion-conducting oxide such that the coating layer is provided in the interface between the positive electrode active material and the solid electrolyte. Moreover, since the chemical potential of the lithium ion-conducting oxide is close to that of the positive electrode active material, the extent of mass transfer between the positive electrode active material and the lithium ion-conducting oxide is small, and a high-resistance layer is rarely formed in the interface.

When the lithium ion-conducting oxide used in the coating layer has electron conductivity, the chemical potential of the positive electrode active material is applied to the sulfide solid electrolyte through the coating layer, thereby producing a high-resistance layer in the interface between the coating layer and the sulfide solid electrolyte. Thus, a lithium ion-conducting oxide having substantially no electron conductivity, i.e., electron transport number of 0.01 or less, is preferred as the lithium ion-conducting oxide used for coating the positive electrode active material surface.

In the present invention, examples of the positive electrode active material include $Li_{1-x}CoO_2$, $Li_{1-x}NiO_2$, $Li_{1-x}Mn_2O_4$, $Li_{1-x}Ni_{1/2}Mn_{1/2}O_2$, $Li_{1-x}Ni_{1/3}Co_{1/3}Mn_{1/3}O_2$, and $Li_{1-x}[Ni_yLi_{1/3-2y/3}Mn_{2/3-y/3}]O_2$ ($0 \leq x \leq 1$, $0 < y < 1/2$) and lithium transition metal oxides prepared by substituting lithium or the transition metal element of the aforementioned lithium transition metal oxides with other elements.

As previously discussed, the advantages of the present invention are particularly significant when the positive electrode active material shows redox reaction in the potential range of 3 V or more. Since these transition metal oxides exhibit a potential of about 4 V in the composition range of $0 < x < 1$, in which lithium ions partially are deintercalated by cell reaction, the advantages of the present invention are particularly significant. Moreover, since the lithium transition metal oxides show high redox potential and the battery thus exhibits high voltage and high energy density, the industrial applicability is particularly high.

A substance having high ion conductivity and stable against electrochemical oxidation is selected as the lithium ion-conducting oxide coating the positive electrode active material surface. Examples of such a substance include oxides containing lithium and titanium, such as $Li_{4/3}Ti_{5/3}O_4$ having a spinel structure, $LiTi_2(PO_4)_3$ having a NASICON structure, and $(Li,La)TiO_3$ having a perovskite structure.

The oxides containing lithium and titanium are preferred for their high ion conductivity and since titanium with a valency of 4 is stable against electrochemical oxidation and does not undergo oxidation reaction by contact with the positive electrode active material having a high potential. An example of a lithium ion-conducting oxide free of titanium and having comparably high ion conductivity and resistance to oxidation is $Li_6BaLa_2Ta_2O_{12}$ containing tantalum.

Among these lithium ion-conducting oxides, insertion/desorption reaction of lithium ions occur at 1.5 V versus a lithium electrode in $Li_{4/3}Ti_{5/3}O_4$, and thus $Li_{4/3}Ti_{5/3}O_4$ functions as an electrode active material having electron conductivity in this potential range. However, $Li_{4/3}Ti_{5/3}O_4$ does not have electron conductivity on the positive electrode active material surface having a high potential. Similarly, $LiTi_2(PO_4)_3$ and $(Li,La)TiO_3$ also exhibit electron conductivity in the range of 1.5 V or less versus a lithium electrode but functions as a lithium ion conductor with no electron conductivity on the positive electrode active material surface having a high potential.

The lithium ion-conducting solid electrolyte mainly composed of a sulfide preferably has an ion conductivity of $10^{-3}$ S/cm or more at room temperature in order to increase the output current. The phrase "mainly composed of a sulfide" means that the solid electrolyte consists of sulfide ions or that about three fourths of the anions contained in the solid electrolyte are sulfide ions.

The sulfide ions are anions with high polarizability. In general, the larger the sulfide ion content, the higher the ion conductivity. Thus, if about three fourths of the anions are sulfide ions, the ion conductivity is not significantly decreased even when other ions are contained. For example, oxide ions that form strong bonds in the structure may be contained in a small amount to stabilize the structure. Thus, the oxide ions may be contained in the solid electrode to an extent that does not adversely affect high ion conductivity. With respect to the range, the ratio of the sulfide ions to the oxide ions is 3:1 or more.

Preferable examples of the solid electrolyte containing sulfide ions and oxide ions include oxy sulfide glass having a composition of $Li_3PO_4$—$Li_2S$—$SiS_2$, $Li_4SiO_4$—$Li_2S$—$SiS_2$, or the like, and preferable examples of the solid electrolyte containing only the sulfide ions include crystallized glass obtained by heating a $Li_2S$—$GeS_2$—$P_2S_5$ or $Li_2S$—$P_2S_5$ sulfide glass having a LISICON crystal structure.

LiI-containing sulfide glass such as LiI—$Li_2S$—$P_2S_5$, LiI—$Li_2S$—$B_2S_3$, LiI—$Li_2S$—$SiS_2$, and the like are also solid electrolytes having an ion conductivity on the order of $10^{-3}$ S/cm at room temperature. However, iodide ions are easily oxidized on the positive electrode active material surface. Ideally, the positive electrode active material surface is coated with a lithium ion-conducting oxide to prevent the chemical potential of the positive electrode active material from being applied to the sulfide solid electrolyte. In this manner, sulfide solid electrolytes containing iodide ions can be used.

However, the ion conductivity of the lithium ion-conducting solid electrolyte discovered so far is lower than that of the sulfide electrolyte, and the resistance of the coating layer increases with the thickness of the coating layer, thereby resulting in decreased output performance. On the other hand, if the thickness of the coating layer is small, the positive electrode active material surface is likely to have incompletely coated portions.

In such portions, oxidation reaction of the iodide ions occurs. Thus, solid electrolytes free of iodide ions are preferable as the solid electrolyte used in portions that contact the positive electrode active material coated with the lithium ion-conducting oxide. Moreover, in the case where a lithium ion-conducting solid electrolyte mainly composed of two or more types of sulfides is used, the lithium ion-conducting solid electrolyte mainly composed of sulfides used in portions that contact the positive electrode active material coated with the lithium ion-conducting oxide is preferably free of iodide ions.

A process suitable to the form of the positive electrode active material is selected as the process of coating the positive electrode active material with the lithium ion-conducting oxide. In the case where the positive electrode active material is powder, for example, it is possible to employ a process including immersing the positive electrode active material in a solution containing starting materials of the lithium ion-conducting oxide or spraying a solution containing starting materials of the lithium ion-conducting oxide while the positive electrode active material powder is allowed to be fluidized so that the solution is applied on the positive electrode active material surface, and then removing the solvent by drying. A suspension of fine particles of the lithium ion-conducting oxide may be used instead of the solution containing the starting materials of the lithium ion-conducting oxide.

When the positive electrode active material has a form of a thin film, it is possible to form a thin film of lithium ion-conducting oxide on the positive electrode active material thin film surface by spin coating, dip coating, or the like using the solution or suspension described above. It is also possible to employ a physical film-forming process such as a vapor deposition process using the lithium ion-conducting oxide as the deposition source. It is also possible to employ a physical deposition process such as a pulsed laser deposition process including preparing a positive electrode active material thin film by pulsed laser deposition and then depositing a thin film of the lithium ion-conducting oxide on the positive electrode active material thin film.

When a solution or suspension is used in forming the coating layer, the solution or suspension must be heated after the solution or suspension is applied on the positive electrode active material surface in order to remove the solvent or dispersant so as to increase the adhesion of the coating layer and in order to conduct thermolysis if the starting material is carbonate or alkoxide. However, under heating at high temperature, interdiffusion occurs between the coating layer and the positive electrode active material particles and the coating layer may lose its function as a result.

When $LiCoO_2$ is used as the positive electrode active material and heat treatment at high temperature is conducted, cobalt diffuses into the coating layer, thereby imparting electron conductivity to the coating layer. If the coating layer exhibits electronic conduction, a high-resistance layer is generated in the interface as previously mentioned. Then, the advantages of the present invention of improving the output performance can no longer be achieved. Accordingly, the heat treatment temperature after formation of the coating layer is preferably in the range of 500° C. or less, more preferably 400° C. or less in which no interdiffusion of substances occurs.

Since the coating layer must be heated at a low temperature, the coating layer is usually in an amorphous state. Thus, a lithium ion-conducting oxide exhibiting high ion conductivity even in an amorphous sate is preferred as the lithium ion-conducting oxide used in the coating layer. For example, $LiTi_2(PO_4)_3$ and $(Li,La)TiO_3$ described above exhibit high ion conductivity in a crystal state but a decreased ion conductivity in an amorphous state. In the case of using a conductor layer in an amorphous state exhibiting a low ion conductivity, it is possible to improve the high-rate discharge performance by increasing the thickness of the coating layer.

In contrast, $LiNbO_3$ and $LiTaO_3$ exhibit higher ion conductivity in an amorphous state than in a crystal state. Thus, an oxide containing lithium and one or both of niobium and tantalum is more preferred as the lithium ion-conducting oxide used in the coating layer. A lithium-containing oxide glass mainly composed of lithium silicate, lithium phosphate, or lithium borate may also be used.

The thickness of the lithium ion-conducting oxide layer coating the surface of the positive electrode active material is preferably as small as possible within the extent that can suppress formation of the high resistance layer. This is because increasing the thickness of the coating layer results in an increase in resistance of the coating layer and a decrease in output performance. On the other hand, if the coating layer is excessively thin, portions not coated with the coating layer are easily created, and high-resistance layers are formed in these portions, thereby degrading the output performance. The preferable range of the thickness of the coating layer is 1 nm or more and 100 nm or less.

It should be noted that the thickness of the coating layer referred here is the average thickness of the coating layer determined by the weight ratio of the positive electrode active material and the coating material, the density of the coating material, and the specific surface area of the positive electrode active material particles. The thickness can be determined as $A/(dS)$ wherein A is the weight ratio of the coating material to the positive electrode active material, d is the density of the coating material, and S is the specific surface area of the positive electrode active material particles.

An existing process known in the art can be employed as the method for making the all-solid lithium battery of the present invention. That is, three layers, namely, a layer of a positive electrode active material having the surface coated with a lithium ion-conducting oxide, a layer of a sulfide lithium ion-conducting solid electrolyte powder, and a negative electrode metal foil, are molded under pressure to make the all-solid lithium battery. Preferably, stainless steel plates are press-welded on both faces of the three-layer molded product to form a collector. A preferred embodiment is a structure of the three-layer molded product in which a mixture of a positive electrode active material powder having the surface coated with a lithium ion-conducting oxide and a sulfide lithium ion-conducting solid electrolyte powder is used in the positive electrode and in which a sulfide lithium ion-conducting solid electrolyte powder is used as the separator.

In the case of the three-layer molded product having a positive electrode composed of this mixture, most electrode reaction occurs at the positive electrode mixture. The main functions of the separator layer are to enable ion conduction and cut off electron conduction between the positive and negative electrodes. Other types of solid electrolyte may be used as the separator of the three-layer molded product described above, but the solid electrolyte used in these portions must also have high ion conductivity. Of the solid electrolytes discovered so far, solid electrolytes other than solid electrolytes mainly composed of sulfides have low ion conductivity (or low decomposition voltage) and thus do not sufficiently function as the separator layer. Thus, it is preferable to use a sulfide lithium ion-conducting solid electrolyte as the separator.

EXAMPLE 1

In this Example, an all-solid lithium battery was produced by using $LiCoO_2$ as the positive electrode active material, $Li_{4/3}Ti_{5/3}O_4$ as the lithium ion-conducting oxide, and $Li_2S$—$GeS_2$—$P_2S_5$ as the sulfide lithium ion-conducting solid electrolyte.

$LiCoO_2$ having an average particle diameter of 10 μm was used. $LiCoO_2$ was synthesized by firing a mixture of starting materials, $Li_2CO_3$ and $CO_3O_4$, at a molar ratio Li/Co=1/1 at 900° C. for 8 hours. A $Li_{4/3}Ti_{5/3}O_4$ layer, i.e., lithium ion-conducting oxide layer, was formed on the surface of a $LiCoO_2$ particle by the following process.

The $Li_{4/3}Ti_{5/3}O_4$ layer was formed by hydrolysis of the alkoxide solution containing lithium and titanium on the $LiCoO_2$ particle surfaces. First, metallic lithium was dissolved in absolute ethanol to prepare an ethanol solution of lithium ethoxide. To the solution, titanium tetraisopropoxide $(Ti(i-OC_3H_7)_4)$ was added so that the molar ratio Li/Ti was 4/5, and the resulting mixture was diluted with absolute ethanol to prepare the alkoxide solution containing lithium and titanium.

The $LiCoO_2$ powder synthesized in advance was placed in a falling fluidized coating machine to form a fluid bed of the $LiCoO_2$ powder, and the alkoxide solution obtained as above was sprayed to coat the $LiCoO_2$ particle surfaces with the alkoxides containing lithium and titanium, followed by hydrolysis using moisture in air. Subsequently, the particles were heated at 400° C. for 30 minutes to decompose organic components to prepare a $LiCoO_2$ powder with a $Li_{4/3}Ti_{5/3}O$ layer on the surface. In this Example, coating was conducted so that the weight ratio of $Li_{4/3}Ti_{5/3}O$ to the $LiCoO_2$ was 0.09%, 0.18%, 0.47%, 0.66%, 0.97%, 2.08%, and 3.36%.

The specific surface area of the $LiCoO_2$ used was 0.26 $m^2/g$, and the density of $Li_{4/3}Ti_{5/3}O$ was 3.46 $g/cm^3$ calculated on the crystallographic data such as lattice constants. The average thickness of the coating layer formed on the surface of the positive electrode active material particle was determined using these values. The average thickness was 1 nm, 2 nm, 5 nm, 7 nm, 10 nm, 20 nm, and 30 nm, respectively.

$Li_2S$, $GeS_2$, and $P_2S_5$ were used as the starting materials for synthesis of the sulfide lithium ion-conducting solid electrolyte. These starting materials were mixed at a ratio of 13:2:3, and the resulting mixture was vacuum sealed in a quartz tube and heated at 500° C. for 10 hours to prepare a fired product. The fired product was ground in an agate mortar to obtain a sulfide lithium ion-conducting solid electrolyte powder represented by $Li_{3.25}Ge_{0.25}P_{0.75}S_4$ having a particle diameter distribution in the range of several micrometers to several ten micrometers. An all-solid lithium battery was then made using the $LiCoO_2$ powder coated with $Li_{4/3}Ti_{5/3}O$ and the sulfide lithium ion-conducting solid electrolyte powder as below.

The $LiCoO_2$ powder coated with $Li_{4/3}Ti_{5/3}O$ and the sulfide lithium ion-conducting solid electrolyte powder were mixed at a weight ratio of 7:3, and the resulting mixture was used in the positive electrode. By mixing the $LiCoO_2$ powder coated with $Li_{4/3}Ti_{5/3}O$ and the sulfide lithium ion-conducting solid electrolyte powder as such, in the positive electrode, the surface of the positive electrode active material that contacts the sulfide lithium ion-conducting solid electrolyte is coated with the lithium ion-conducting oxide.

The positive electrode thus prepared (12.7 mg), the solid electrolyte powder (150 mg) obtained as above as the separator layer, and a counter electrode composed of an indium-lithium alloy (indium: 60 mg, lithium: 2 mg) prepared by press-welding small pieces of indium and lithium foils to diffuse lithium into indium were molded under pressure to form a three-layer structure to thereby produce an all-solid lithium battery. The thickness of the positive electrode layer, the electrolyte layer, and the negative electrode layer was about 50 μm, 1 mm, and 0.1 mm, respectively. The cross-sectional area was 0.785 $cm^2$. Stainless steel plates were press-welded on both sides of the three-layer molded product to form a collector. For comparison, another all-solid lithium battery was prepared by the same process but using $LiCoO_2$ powder not coated with $Li_{4/3}Ti_{5/3}O_4$.

Figure 1:
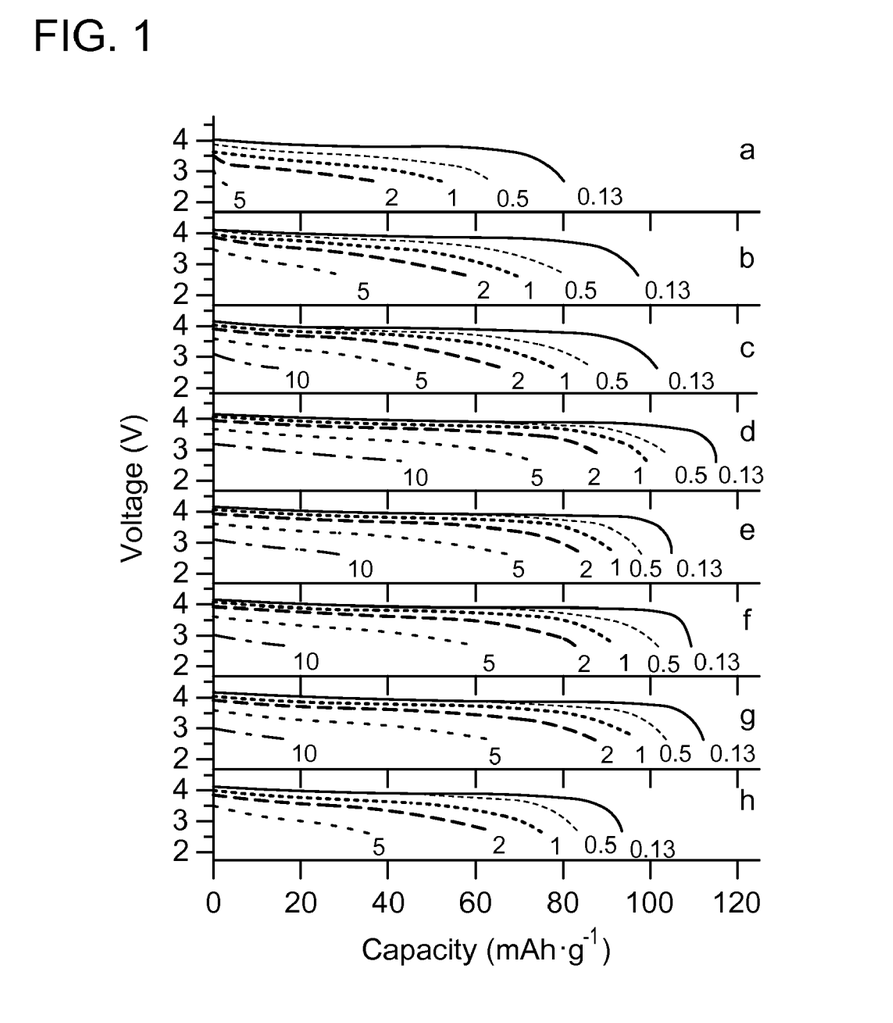
FIG. 1 Graphs comparatively showing discharge curves of all-solid lithium batteries in Example 1 of the present invention (b to h) and discharge curves of a comparative example (a).

The high-rate discharge performance of the all-solid lithium batteries thus prepared was evaluated by a galvanostatic charge/discharge method. FIG. 1 shows results of discharge at various current densities after each all-solid lithium battery was charged at a constant current. In FIG. 1, (b) to (h) are discharge curves of all-solid lithium batteries using $LiCoO_2$ with coating layers having an average thickness of 1 nm, 2 nm, 5 nm, 7 nm, 10 nm, 20 nm, and 30 nm, respectively. Furthermore, (a) shows discharge curves of a comparative all-solid lithium battery using uncoated $LiCoO_2$. The figures in the graphs show the discharge current density and the unit is $mA/cm^2$. In this Example, an indium-lithium alloy was used as the negative electrode, and the potential of the negative electrode was 0.62 V versus a metallic lithium electrode. In other literatures, the performance of the batteries with negative electrodes composed of metallic lithium are usually reported. Thus, to facilitate the comparison, 0.62 V was added to the battery voltage to convert the voltage of the positive electrode on the lithium electrode basis, and the resulting values are indicated in the ordinate.

As obvious from these results, the all-solid lithium batteries with coated $LiCoO_2$ underwent a small decrease in capacity when the discharge current density was increased. Whereas substantially no discharge capacity was obtained from the battery using uncoated electrode active material at a current density of 5 $mA/cm^2$ or more, discharge of the batteries with the coated electrode active material was possible even at a current density of 10 $mA/cm^2$.

Figure 2:
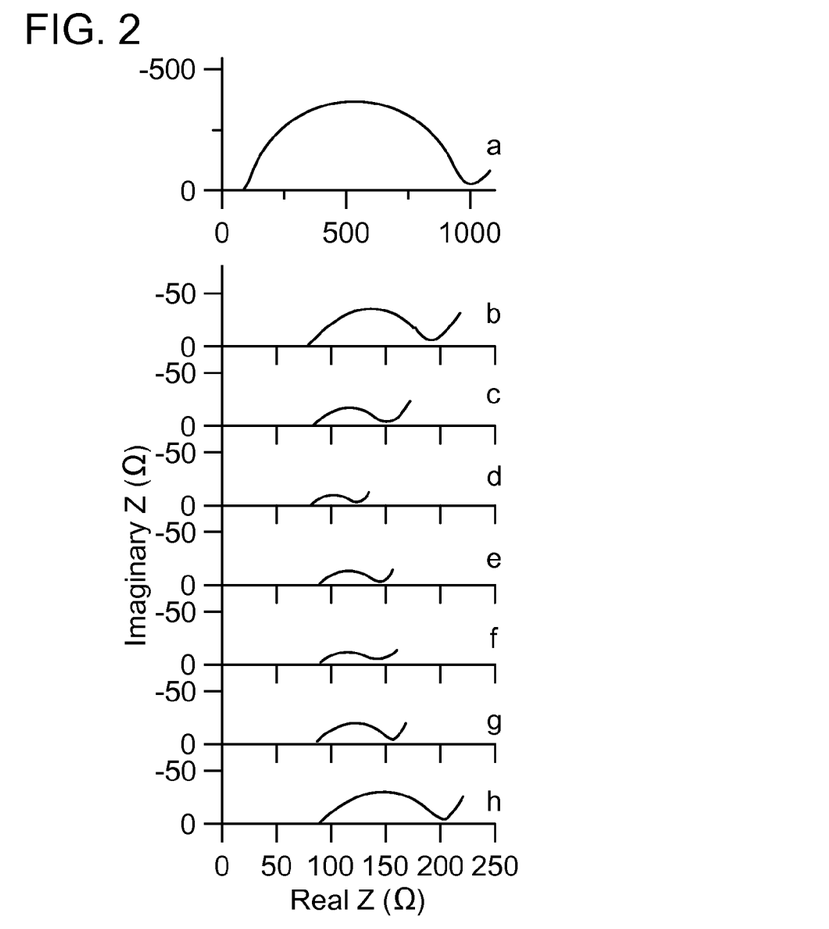
FIG. 2 Graphs comparatively showing the results of the AC impedance measurement of all-solid lithium batteries in Example 1 of the present invention (b to h) and that of a comparative example (a).

FIG. 2 shows the impedance characteristics of the batteries observed by an AC impedance method after the all-solid lithium batteries are charged. In FIG. 2, the impedance spectra of a to h are that of the all-solid lithium batteries a to h shown in FIG. 1. The abscissa indicates the real component of the complex impedance, and the ordinate indicates the imaginary component of the complex impedance. The semicircle in the complex impedance plot corresponds to the impedance of the positive electrode. It can be understood from these graphs that the impedance of the positive electrode is reduced to as much as about 1/20 in some case when the $LiCoO_2$ particle surfaces are coated with $Li_{4/3}Ti_{5/3}O_4$.

In order to investigate the effect of the temperature of heating the coating layer on the battery performance, $LiCoO_2$ powder surface-coated with $Li_{4/3}Ti_{5/3}O_4$ was prepared by the same process as above but at a heating temperature of 600° C. after the coating, and an all-solid lithium battery was prepared using this $LiCoO_2$ powder.

Figure 3:
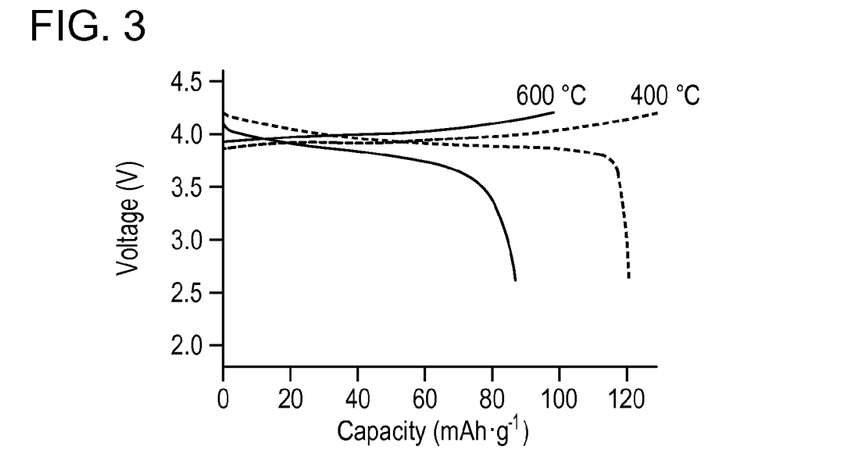
FIG. 3 A graph comparatively showing the charge-discharge curves of the all-solid lithium batteries of Example 1 of the present invention (in dotted lines) and that of a comparative example (in solid lines).

FIG. 3 shows the results of charge and discharge, at a constant current of 50 μA, of the all-solid lithium battery using a $LiCoO_2$ powder heat-treated at 400° C. after coating and the all-solid lithium battery using a $LiCoO_2$ powder heat-treated at 600° C. Note that in FIG. 3 also, the ordinate indicates values of positive electrode voltage converted on a lithium electrode basis. The all-solid lithium battery incorporating the positive electrode active material heat-treated at 600° C. exhibited a higher charge voltage than the all-solid lithium battery heat-treated at 400° C. This difference in voltage is presumably attributable to the fact that the impendence of the positive electrode is higher in the all-solid lithium battery heated at 600° C. and the overvoltage during charging increased as a result. The all-solid lithium battery heated at 600° C. reached the charge end voltage faster and the discharge capacity was low due to the high overvoltage.

As is obvious from the example above, the impedance of the battery could be decreased and an all-solid lithium battery with excellent output performance could be obtained by coating the surface of the positive electrode active material with the lithium ion-conducting oxide and adjusting the heat-treating temperature after the coating to 400° C. or less.

EXAMPLE 2

In this example, an all-solid lithium battery was produced by using $LiMn_2O_4$ as the positive electrode active material, $LiTi_2(PO_4)_3$ as the lithium ion-conducting oxide, and a $Li_3PO_4$—$Li_2S$—$SiS_2$ glass as the sulfide lithium ion-conducting solid electrolyte. $LiMn_2O_4$ was synthesized by firing a mixture of lithium carbonate and manganese oxide having a molar ratio Li/Mn of 1/2 at 800° C. for 8 hours.

Metallic lithium was dissolved in absolute ethanol to prepare an alkoxide solution of lithium. Diphosphorus pentaoxide was dissolved in absolute ethanol to prepare an alkoxide solution of phosphorus. Titanium tetraisopropoxide (Ti(i-$OC_3H_7)_4$) and then absolute ethanol were added to these alkoxide solutions to prepare a coating solution having a solid content ($LiTi_2(PO_4)_3$) of 39 mg per liter of the coating solution.

To the $LiMn_2O_4$ powder (100 mg) synthesized above, 42 mL of the coating solution was added, and the alcohol was evaporated under stirring. Subsequently, the residue was fired at 400° C. and 600° C. for 12 hours to obtain $LiMn_2O_4$ powders having $LiTi_2(PO_4)_3$ modifying layers on the surface. The average thickness of the $LiTi_2(PO_4)_3$ coating layers in this example was calculated from the specific surface area of the $LiMn_2O_4$ powder and the density of $LiTi_2(PO_4)_3$ calculated from the lattice constant. The average thickness was about 25 nm. The electrode performance of the $LiMn_2O_4$ with the modifying layer formed as such was evaluated in an all-solid lithium battery incorporating a solid electrolyte composed of the $Li_3PO_4$—$Li_2S$—$SiS_2$ sulfide glass synthesized as above.

$Li_3PO_4$, $Li_2S$, and $SiS_2$ were mixed at a ratio of 1:63:36. The resulting mixture was placed in a glassy carbon crucible and heated to 900° C. in argon stream to yield a molten state. The resulting melt was quenched with a twin roller to synthesize $Li_3PO_4$—$Li_2S$—$SiS_2$ sulfide glass.

The $LiMn_2O_4$ powder and the sulfide glass obtained as such were pulverized in a pulverizer to prepare solid electrolyte powders having a particle diameter of several micrometers, and the powders were mixed at a weight ratio of 6:4 to prepare a positive electrode. This positive electrode (10 mg) and a metallic indium foil as the negative electrode were press-molded with the solid electrolyte powder obtained above as the separator layer therebetween to form an all-solid lithium battery. The thickness of the positive electrode layer, the electrolyte layer, and the negative layer was about 40 μm, 1 mm, and 0.1 mm, respectively. Stainless-steel plates were press-welded on both sides of this three-layer molded product to form a collector. For comparison, an all-solid lithium battery using $LiMn_2O_4$ before modification with $LiTi_2(PO_4)_3$ was made by the same process.

Figure 4:
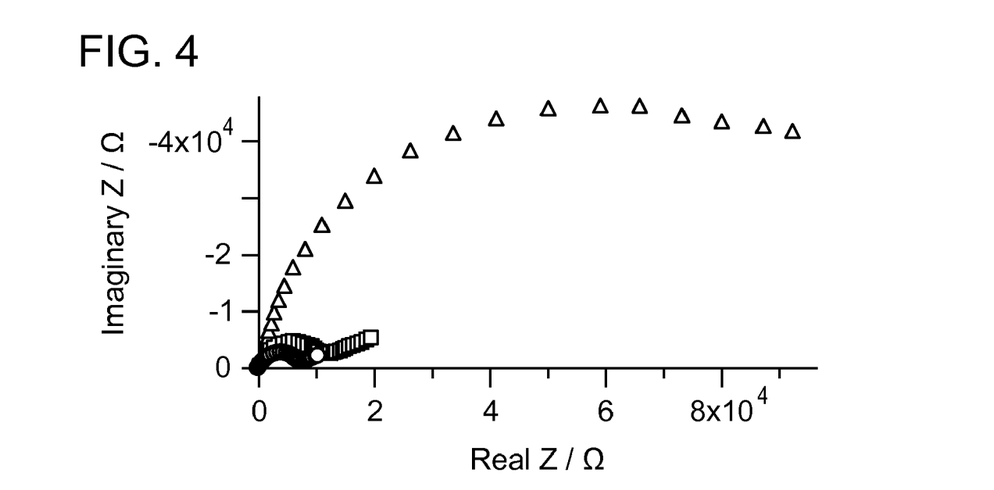
FIG. 4 A graph comparatively showing the results of the AC impedance measurement of all-solid lithium batteries of Example 2 of the present invention (circles and squares) and that of a comparative example (triangles).

The all-solid lithium battery obtained as such was charged with the electrical quantity yielding a positive electrode composition of $Li_{0.9}Mn_2O_4$, and the electrode performance of the positive electrode at this charge depth was evaluated by an AC impedance method. The results are shown in FIG. 4. In FIG. 4, the impedance of the all-solid lithium batteries using $LiMn_2O_4$ coated by using a heat-treatment temperature of 600° C. is indicated by circles, and that using a heat-treatment temperature of 400° C. is indicated by squares. The impedance of the comparative all-solid lithium battery using uncoated $LiMn_2O_4$ is indicated by triangles. The abscissa indicates the real component of the complex impedance and the ordinate indicates the imaginary component of the complex impedance. As shown in FIG. 4, the size of the semicircle corresponding to the impedance of the positive electrode can be dramatically reduced by forming the $LiTi_2(PO_4)_3$ modifying layer, and the resistance of the all-solid lithium battery could be significantly reduced by coating the surface of the $LiMn_2O_4$ particles.

In this Example, the impedance of the battery that underwent heat treatment at 600° C. after coating of the positive electrode active material was slightly lower than that at 400° C., which was described as preferable for the present invention. This is presumably because the effect of increased ion conductivity of the coating layer caused by crystallization and the effect of decreasing the impedance of the positive electrode are larger than the effect of increasing the impedance by diffusion of manganese. However, the difference in impedance due to the difference in heat treatment temperature is small compared to the proportion of the impedance reduction resulting from the coating. It is obvious that the present invention is effective for reducing the internal impedance of the all-solid lithium battery.

EXAMPLE 3

In this Example, a $LiCoO_2$ thin film was used as the positive electrode active material, and a $Li_{4/3}Ti_{5/3}O_4$ thin film was formed as the lithium ion-conducting oxide on the surface of the $LiCoO_2$ film. As in Example 1, $Li_2S$—$GeS_2$—$P_2S_5$ was used as the sulfide lithium ion-conducting solid electrolyte.

The $LiCoO_2$ thin film was formed by pulsed laser deposition. The deposition source used was a pellet prepared by mixing $Li_2CO_3$ and $Co_3O_4$ such that the composition was $Li_{1.3}CoO_2$, firing the resulting mixture at 900° C., and sintering the mixture. Using this pellet as the deposition source, a $LiCoO_2$ thin film was deposited to a thickness of about 150 nm on a platinum plate in an oxygen atmosphere.

A $Li_{4/3}Ti_{5/3}O_4$ thin film was then formed on the $LiCoO_2$ thin film fabricated as such. In forming the thin film, pulsed laser deposition was employed as with $LiCoO_2$. First, $Li_2CO_3$ powder and $TiO_2$ powder were mixed such that the molar ratio Li/Ti was 1.03, and the resulting mixture was fired at 600° C. to obtain a Li—Ti—O powder as the deposition source for making the $Li_{4/3}Ti_{5/3}O_4$ thin film. This powder was palletized and fired at 600° C. to obtain a target. A $Li_{4/3}Ti_{5/3}O_4$ thin film having a thickness of about 40 nm was formed on the $LiCoO_2$ thin film on the platinum plate obtained as above using this target.

The electrode performance of the positive electrode active material/lithium ion-conducting oxide multilayer structure obtained as such was evaluated in a sulfide lithium ion-conducting solid electrolyte represented by $Li_{3.25}Ge_{0.25}P_{0.75}S_4$ obtained in Example 1. An indium-lithium alloy (indium: 65 mg, lithium: 2 mg) prepared by press-welding a small piece of lithium foil onto an indium foil to diffuse lithium in indium was used as the counter electrode. The thickness of the positive electrode layer, the electrolyte layer, and the negative electrode layer was about 0.2 μm, 1 mm, and 0.1 mm, respectively.

Figure 5:
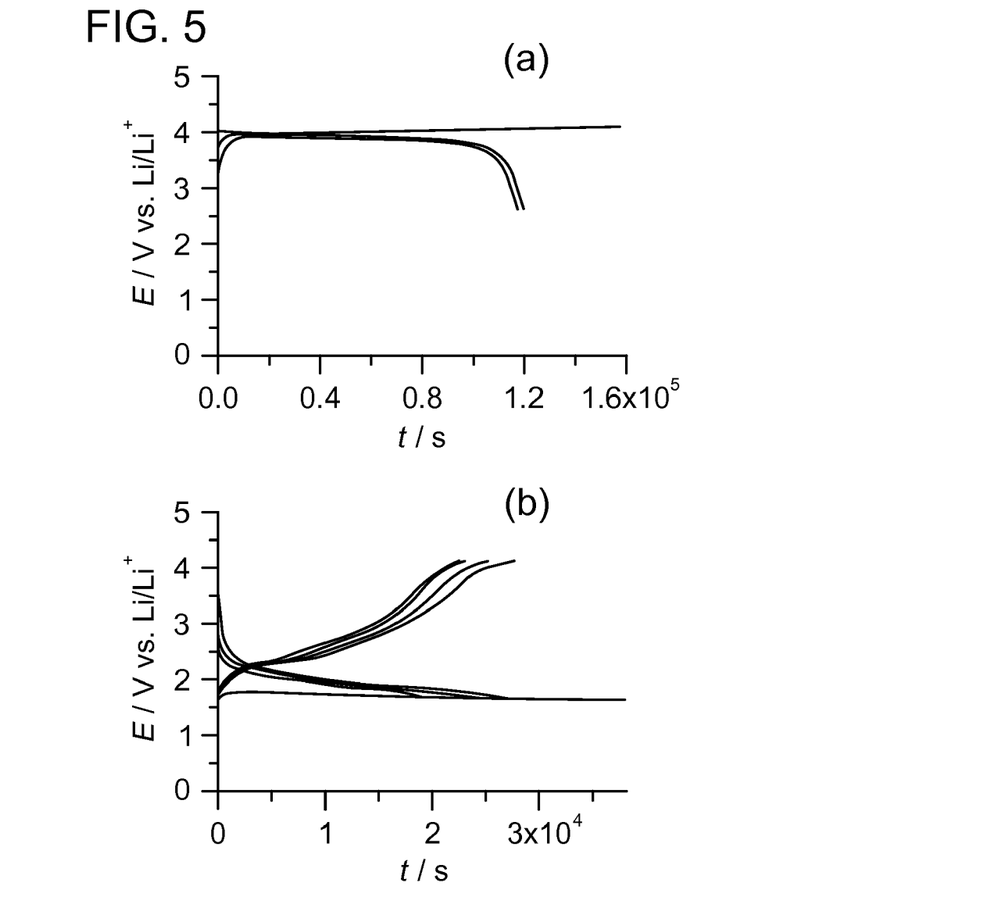
FIG. 5 Graphs comparatively showing charge-discharge curves of all-solid lithium batteries of Example 3 of the present invention (a) and that of a comparative example (b).

The charge-discharge curves obtained by a galvanostatic charge-discharge method are shown in FIG. 5(a). In FIG. 5(a), the abscissa indicates time, and the ordinate indicates the potential of the positive electrode versus lithium electrode calculated from the cell voltage determined using the potential of In—Li used as the counter electrode (0.62 V versus a lithium electrode). As FIG. 5(a) clearly shows, the $LiCoO_2$ thin film with the $Li_{4/3}Ti_{5/3}O_4$ thin film formed as the modifying layer yields smooth insertion-desorption reaction of lithium ions at a potential of 4 V. The same measurement was conducted without forming the $Li_{4/3}Ti_{5/3}O_4$ layer for comparison. As shown in FIG. 5(b), charge-discharge reaction was barely observed in a 4 V region.

In a thin film battery, since the thickness of the electrode active material layer is small, the effect of the abnormalities in the interface on the electrode performance is significantly large. As demonstrated in this example, the effect of forming the lithium ion-conducting oxide layer on the positive electrode active material surface is significantly large.

EXAMPLE 4

In this Example, an all-solid lithium battery was formed as in Example 1 except that $LiNbO_3$ was used as the lithium ion-conducting oxide. Formation of the $LiNbO_3$ coating layer on the $LiCoO_2$ particle surface was conducted as in Example 1 except that niobium pentaethoxide ($Nb(OC_2H_5)_5$) was used instead of titanium tetraisopropoxide used in Example 1. The coating with $LiNbO_3$ was conducted such that the average thickness of the coating layer calculated from the amount of coating was in the range of 1 nm to 20 nm.

Figure 6:
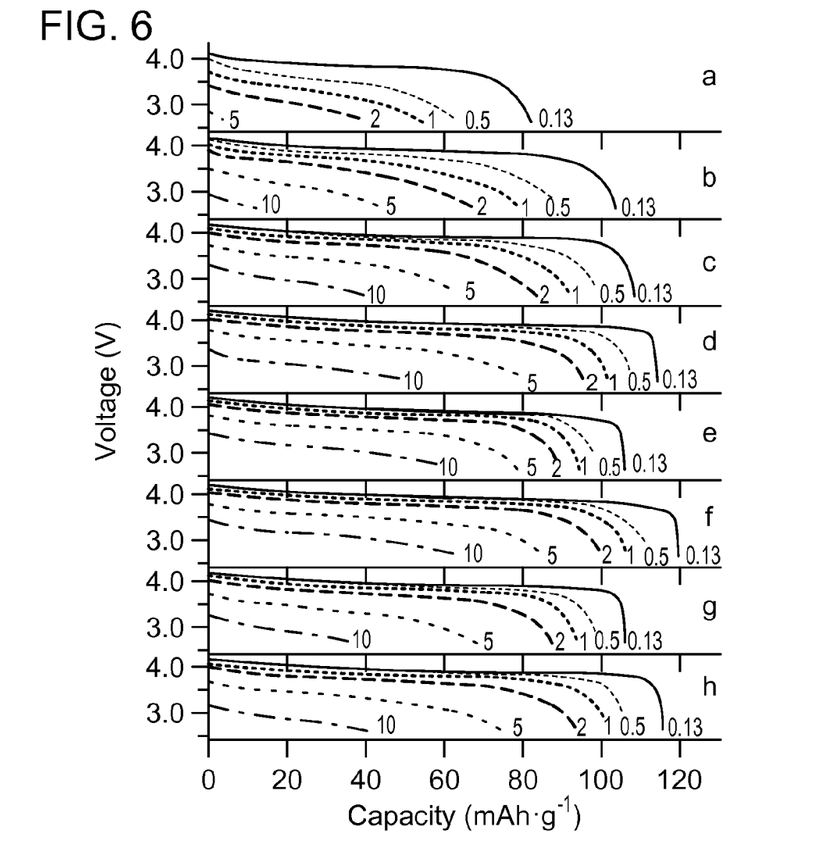
FIG. 6 Graphs comparatively showing discharge curves of all-solid lithium batteries of Example 4 of the present invention (b to h) and that of a comparative example (a).

FIG. 6 shows the results of the evaluation of the high-rate discharge performance of the battery thus prepared, the evaluation being conducted by the same method as in Example 1. In FIG. 6, (b) to (h) show discharge curves of all-solid lithium batteries using coated $LiCoO_2$ and the average thickness was 1 nm, 2 nm, 5 nm, 7 nm, 10 nm, 15, nm, and 20 nm, respectively. In (a), the discharge curve of a comparative all-solid lithium battery with uncoated $LiCoO_2$ is shown. As in FIG. 1, the figures in the graph indicate the discharge current density and the unit is mA/cm². The ordinate indicates the voltage of the positive electrode converted on a lithium electrode basis.

Figure 7:
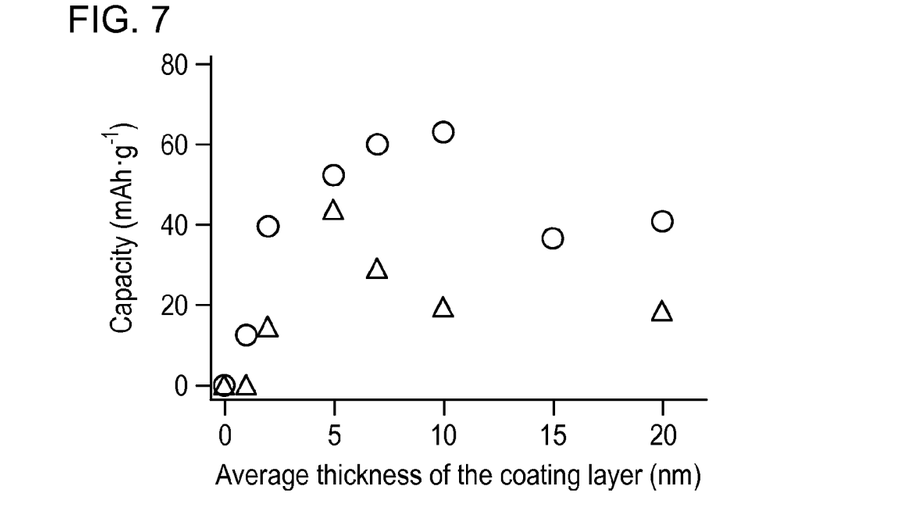
FIG. 7 A graph showing the discharge capacity of the all-solid lithium battery of Example 4 of the present invention (circles) and the discharge capacity of the all-solid lithium battery of Example 1 (triangles) during discharge at a current density of 10 mA/cm².

As FIG. 6 clearly shows, the discharge capacity during discharge at large current notably increases by coating $LiCoO_2$ with $LiNbO_3$. It can be found that the high-rate discharge performance largely improved by the present invention. Moreover, FIG. 7 shows the discharge capacity of the all-solid lithium battery of this Example and the all-solid lithium battery made in Example 1 when discharge was conducted at 10 mA/cm$^2$. In the graph, the abscissa indicates the average thickness of the coating layer calculated from the amount of coating, circles indicate the discharge capacities of the all-solid lithium battery of this Example, and triangles indicate the discharge capacities of the all-solid lithium battery made in Example 1.

FIG. 7 clearly shows that the all-solid lithium battery of this Example shows a discharge capacity larger than that in Example 1 and that the battery of this example has excellent high-rate discharge performance. Moreover, high discharge capacity is maintained over a wide range even when the thickness of the coating layer is varied. This shows that it is preferable to use $LiNbO_3$ as the coating material.

EXAMPLE 5

In this Example, an all-solid lithium battery was formed as in Example 1 except that $LiTaO_3$ was used as the lithium ion-conducting oxide. Formation of the $LiTaO_3$ coating layer on the $LiCoO_2$ particle surface was conducted as in Example 1 except that tantalum pentaethoxide ($Ta(OC_2H_5)_5$) was used instead of titanium tetraisopropoxide used in Example 1. The coating with $LiTaO_3$ was conducted such that the average thickness of the coating layer calculated from the amount of coating was 1 nm to 20 nm.

Figure 8:
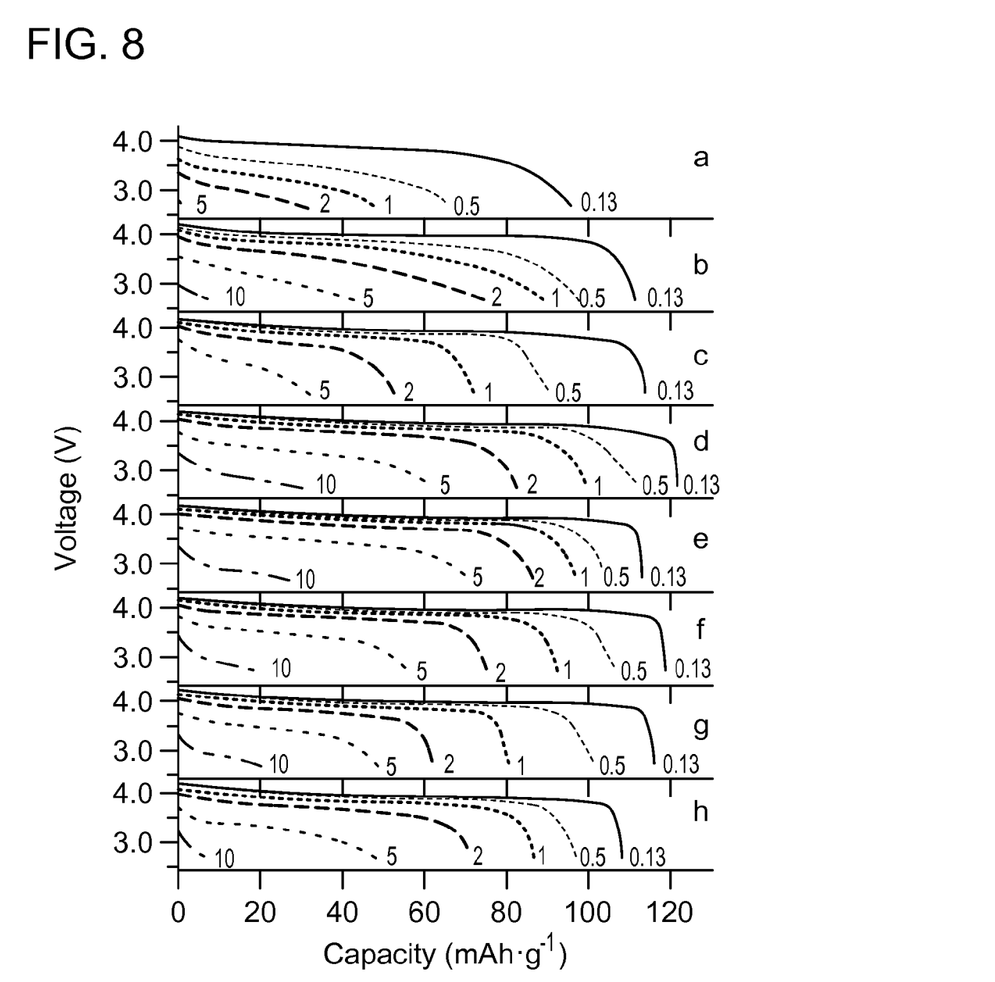
FIG. 8 Graphs comparatively showing the discharge curves of the all-solid lithium batteries of Example 5 of the present invention (b to h) and that of a comparative example (a).

FIG. 8 shows the results of evaluation of the high-rate discharge performance of the resulting battery, the evaluation being conducted as in Example 1. In FIG. 8, (b) to (h) are discharge curves of all-solid lithium batteries using coated $LiCoO_2$, and the average thickness of the coating layers were 1 nm, 2 nm, 5 nm, 7 nm, 10 nm, 15 nm, and 20 nm, respectively. Furthermore, (a) shows discharge curves of a comparative all-solid lithium battery using uncoated $LiCoO_2$. As in FIG. 1, the figures in the graphs show the discharge current density and the unit is mA/cm$^2$. The ordinate indicates the voltage of the positive electrode converted on a lithium electrode basis.

FIG. 8 clearly shows that the discharge capacity during discharge at large current notably increases by coating $LiTaO_3$ with $LiCoO_2$. This shows that the high-rate discharge performance increases significantly by the present invention.

EXAMPLE 6

In this Example, an all-solid lithium battery was formed as in Example 4 except that $Li_{1.1}Mn_{1.9}O_4$ was used as the positive electrode active material. $Li_{1.1}Mn_{1.9}O_4$ having a BET surface area of 0.4 m$^2$/g was used. A $LiNbO_3$ coating layer was formed on the $Li_{1.1}Mn_{1.9}O_4$ particle surface as in Example 4. The coating with $LiNbO_3$ was conducted such that the average thickness of the coating layer calculated from the amount of coating was in the range of 1 nm to 20 nm.

Figure 9:
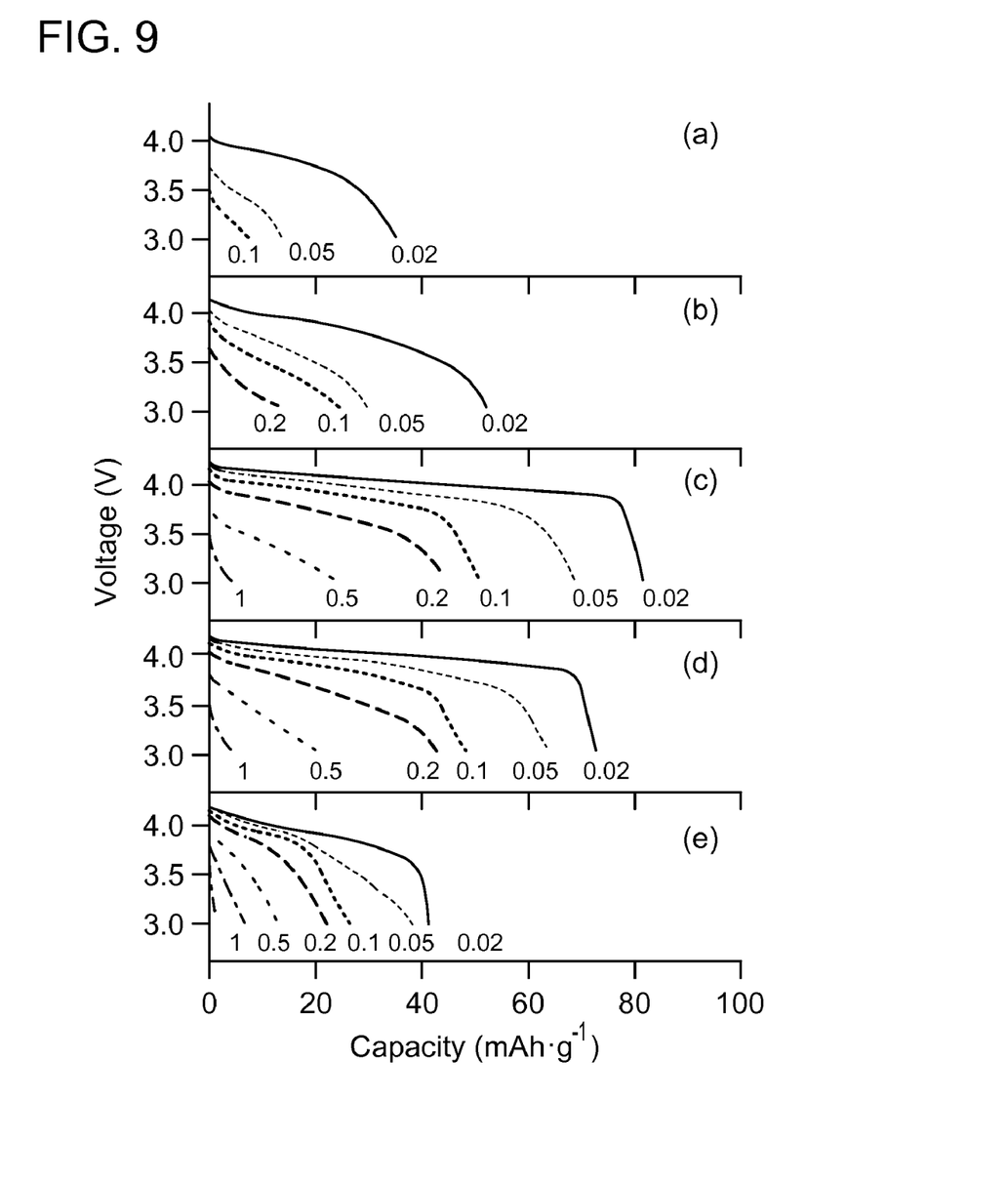
FIG. 9 Graphs comparatively showing the discharge curves of the all-solid lithium batteries of Example 6 of the present invention (b to e) and that of a comparative example (a).

The $Li_{1.1}Mn_{1.9}O_4$ powder coated with $LiNbO_3$ and the sulfide solid electrolyte represented by $Li_2S$—$GeS_2$—$P_2S_5$ synthesized in Example 1 were mixed at a weight ratio of 1:1, and the battery was made as in Example 1 except that 15 mg of this mixture was used as the positive electrode. The high-rate discharge performance of the battery was evaluated. The results are shown in FIG. 9. In FIG. 9, (b) to (e) are discharge curves of all-solid lithium batteries with coated $Li_{1.1}Mn_{1.9}O_4$, and the average thickness of the coating layer was 5 nm, 7 nm, 10 nm, and 20 nm, respectively. Furthermore, (a) shows discharge curves of a comparative all-solid lithium battery using uncoated $L_{1.1}Mn_{1.9}O_4$. As in FIG. 1, the figures in the graph indicate the discharge current density and the unit is mA/cm$^2$. The ordinate indicates the voltage of the positive electrode converted on a lithium electrode basis.

As FIG. 9 clearly shows, the discharge capacity during discharge at large current notably increases by coating with $LiNbO_3$. The high-rate discharge performance is largely improved by the present invention.

EXAMPLE 7

In the above examples, an all-solid lithium battery using an indium-lithium alloy in the negative electrode was made. In order to investigate changes in impedance of the positive electrode, a negative electrode having an impedance vanishingly small relative to the total impedance of the battery must be used so that the changes in impedance of the positive electrode can be clearly detected as the changes in battery performance. The indium-lithium alloy has an extremely high exchange current density and functions as a negative electrode having a low impedance. Thus, in the above examples, such a negative electrode was used in the battery structure.

However, the investigations by the present inventors have found that in most cases the reaction resistance of the positive electrode is the rate-controlling step causing low output performance in the all-solid lithium battery using the sulfide solid electrolyte. Thus, the effects of the present invention of decreasing the impedance of the positive electrode and improving the high-rate discharge performance of the all-solid lithium battery are not limited to the all-solid lithium batteries using the indium-lithium alloy in the negative electrode. That is, the present invention are equally effective for increasing the output of the all-solid lithium batteries using graphite, which is used in commercially available lithium ion batteries, and the all-solid lithium batteries using metallic lithium. In this Example, in order to specifically demonstrate such effects, an all-solid lithium battery using a graphite as the negative electrode active material was made and the output performance thereof was evaluated.

$LiCoO_2$ having a $Li_{4/3}Ti_{5/3}O_4$ coating layer 5 nm in average thickness prepared in Example 1 was used as the positive electrode active material, and artificial graphite was used as the negative electrode active material. A 70 $Li_2S$-30 $P_2S_5$ glass ceramic synthesized as below was used as the lithium ion-conducting solid electrolyte mainly composed of a sulfide. $Li_2S$ and $P_2S_5$ were used as the starting materials, and a $Li_2S$—$P_2S_5$ glass was synthesized by mechanical milling in a planetary ball mill. Pulverization was conducted with an alumina pot and balls by mechanical milling at 370 rpm for 20 hours. Subsequently, the $Li_2S$—$P_2S_5$ glass synthesized as such was heated at 290° C. for 10 hours to crystallize, thereby obtaining a glass ceramic.

An all-solid lithium battery was made using the above-described materials. In this battery, 12.7 mg of a mixture of $LiCoO_2$ provided with a $Li_{4/3}Ti_{5/3}O_4$ coating layer 5 nm in average thickness and a glass ceramic solid electrolyte at a weight ratio of 7:3 was used as the positive electrode, and 5.1 mg of a mixture of artificial graphite and the glass ceramic at a weight ratio of 7:3 was used as the negative electrode.

Figure 10:
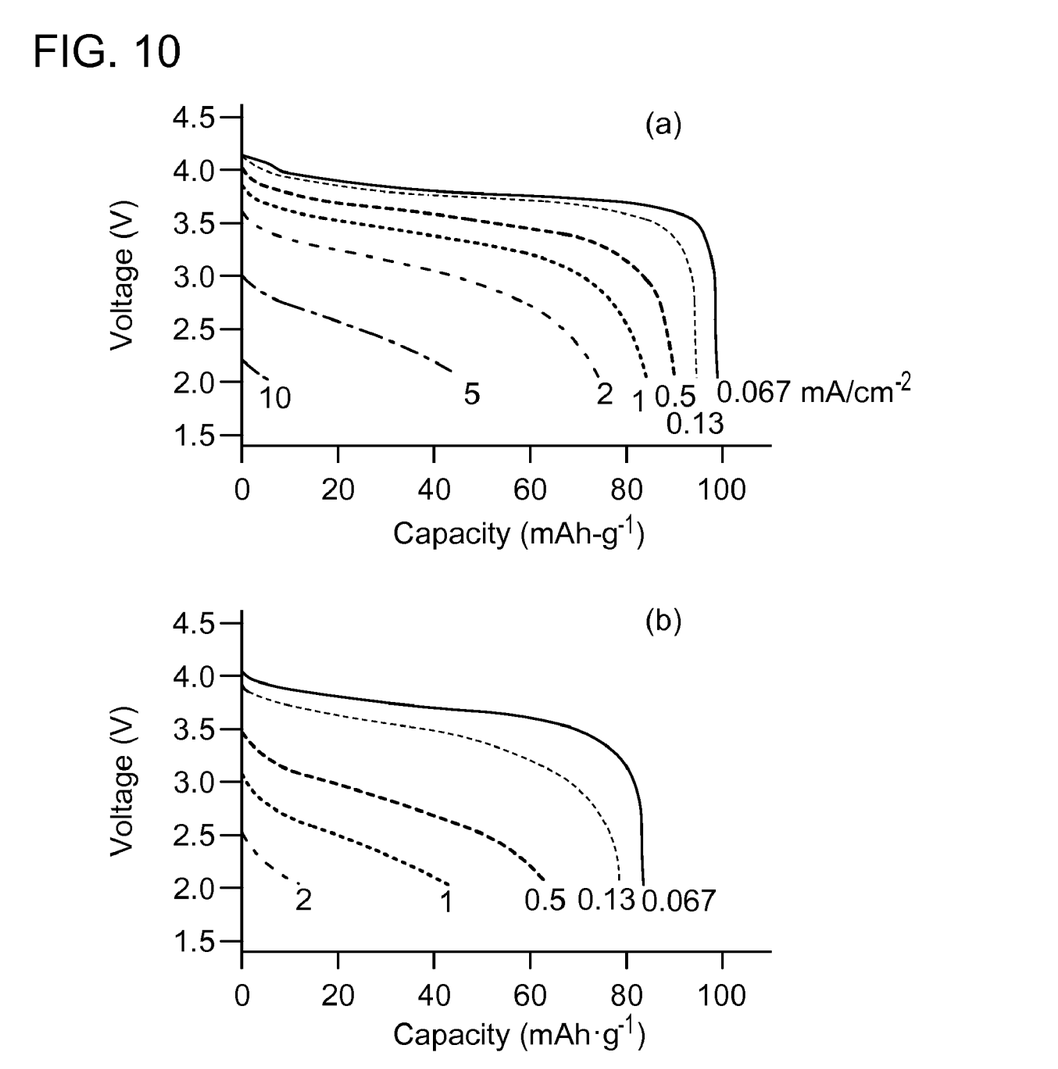
FIG. 10 Graphs comparatively showing the discharge curve of the all-solid lithium battery of Example 7 of the present invention (a) and that of a comparative example (b).

Moreover, for comparison, $LiCoO_2$ not provided with a $Li_{4/3}Ti_{5/3}O_4$ coating layer was used as the positive electrode active material to form an all-solid lithium battery by the same process as above. FIG. 10 shows the results of discharge of the resulting all-solid lithium batteries at various current values. In the graphs, (a) shows discharge curves of a battery with coated $LiCoO_2$, and (b) shows discharge curves of a comparative battery with $LiCoO_2$ not provided with a coating layer. The figures in the graphs indicate the discharge current density, the ordinate indicates the battery voltage, and the abscissa indicates the discharge capacity converted on a basis of unit weight of $LiCoO_2$. The all-solid lithium battery using $LiCoO_2$ provided with the $Li_{4/3}Ti_{5/3}O_4$ coating layer underwent a smaller decrease in discharge capacity when the output current density was increased and maintained a discharge capacity of about 50% of the capacity during low-current discharge even during large current discharge at 5 mA/cm².

The above results show that the present invention in which the positive electrode active material is coated with the lithium-ion conducting oxide is effective in improving the high-rate discharge performance of not only all-solid lithium batteries using the indium-lithium alloy in the negative electrode but also all-solid lithium batteries with various negative electrode active materials.

INDUSTRIAL APPLICABILITY

In the existing lithium batteries that use flammable organic solvents in the electrolytes, it is difficult to completely avoid the danger of fire or the like. In particular, while vehicle-mounted lithium batteries and stationary lithium batteries are under development due to the advantages such as light-weightness and high energy density, it becomes ever more difficult to take measures for safety since the size of the batteries increases when the batteries are applied to such usage.

All-solid lithium batteries using a non-flammable inorganic solid electrolyte as the electrolyte are expected to provide a radical solution to the problems of the lithium batteries, in particular, to achieve advantages in large-size batteries, but had difficulties in achieving high output density required in such usages.

According to the present invention, the output of the all-solid lithium battery having high safety is increased. Thus, the batteries can be used not only in the fields in which the lithium batteries have been used but also as various energy sources demanded in the future.

The invention claimed is:

1. An all-solid lithium battery comprising:
a negative electrode, a lithium ion-conducting solid electrolyte, and a positive electrode, wherein the lithium ion-conducting solid electrolyte is mainly composed of a sulfide, and a positive electrode active material is coated with a lithium ion-conducting oxide so that the lithium ion-conducting oxide is interposed between the positive electrode active material and the solid electrolyte.

2. The all-solid lithium battery according to claim 1, wherein the positive electrode active material shows redox reaction at a potential of 3 V or more on a lithium electrode basis during operation of the all-solid lithium battery.

3. The all-solid lithium battery according to claim 1, wherein the lithium ion-conducting oxide is an oxide that does not show substantial electronic conduction but contains lithium and titanium.

4. The all-solid lithium battery according to claim 1, wherein the lithium ion-conducting solid electrolyte mainly composed of the sulfide has an ion conductivity of $1 \times 10^{-3}$ S/cm or more at room temperature.

5. The all-solid lithium battery according to claim 1, wherein the lithium ion-conducting solid electrolyte mainly composed of the sulfide is free of iodide ions.

6. The all-solid lithium battery according to claim 1, wherein the lithium ion-conducting solid electrolyte mainly composed of the sulfide is a solid electrolyte mainly composed of two or more types of sulfides, and the lithium ion-conducting solid electrolyte mainly composed of the sulfides used in a portion that contacts the positive electrode active material coated with the lithium ion-conducting oxide is free of iodide ions.

7. The all-solid lithium battery according to claim 1, wherein the positive electrode active material is a powder or a film.

8. The all-solid lithium battery according to claim 1, wherein the lithium ion-conducting oxide is amorphous.

9. The all-solid lithium battery according to claim 1, wherein the lithium ion-conducting oxide contains lithium and one or both of niobium and tantalum.

10. The all-solid lithium battery according to claim 1, wherein the lithium ion-conducting oxide is a lithium-containing oxide glass selected from the group consisting of lithium silicate, lithium phosphate, and lithium borate.

11. The all-solid lithium battery according to claim 1, wherein the thickness of the coating is in the range of 1 nm to 100 nm.

12. The all-solid lithium battery according to claim 1, wherein a mixture of a positive electrode active material powder coated with the lithium ion-conducting oxide and a lithium ion-conducting solid electrolyte powder mainly composed of the sulfide is used as a positive electrode and a lithium ion-conducting solid electrolyte powder layer mainly composed of a sulfide is used as a separator.

13. A method for making a positive electrode used in the all-solid lithium battery according to claim 1, comprising:
applying a solution containing an element to constitute a coating layer of lithium ion-conducting oxide or a suspension of time particles of the lithium ion-conducting oxide on a surface of a positive electrode active material, thereby obtaining a coated positive electrode active material, and
heating the coated positive electrode active material at a temperature of 400° C. or less.

14. A method for making a positive electrode used in the all-solid lithium battery-according to claim 13, wherein the coating layer of the lithium ion-conducting oxide is formed on the surface of a positive electrode active material by a physical deposition technique.

* * * * *